June 30, 1942.  S. C. HOARE ET AL  2,288,399
ELECTRICAL MEASURING DEVICE
Filed Oct. 11, 1940
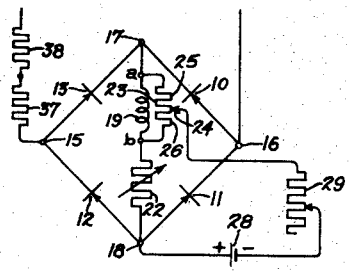
Fig. 1.
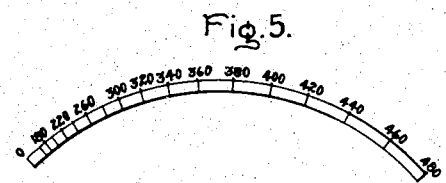
Fig. 5.
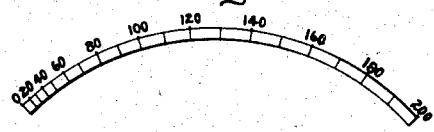
Fig. 6.
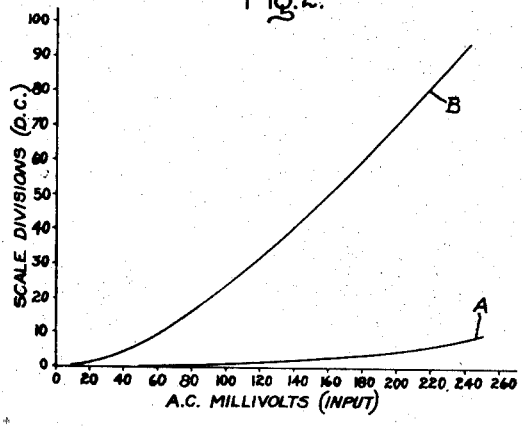
Fig. 2.
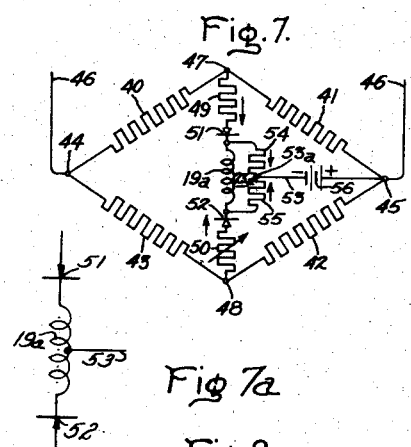
Fig. 7.
Fig. 7a
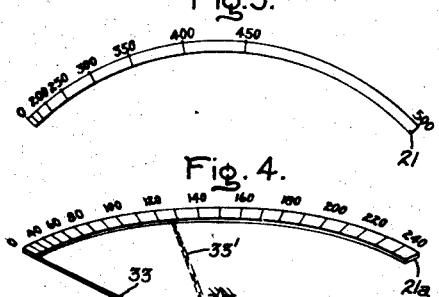
Fig. 3.
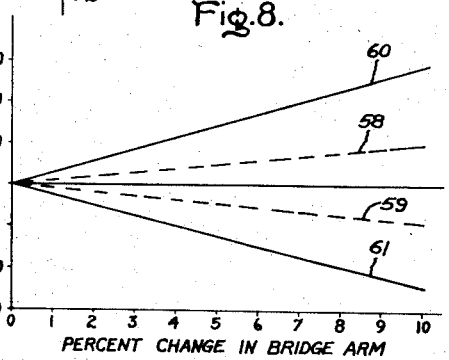
Fig. 8.
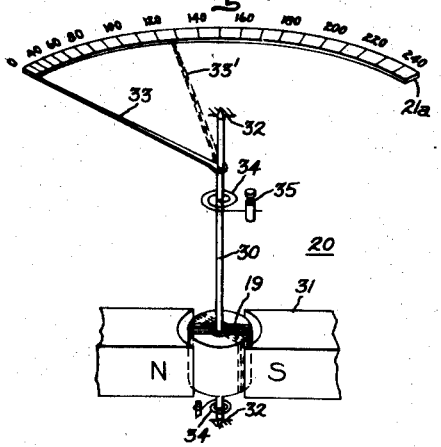
Fig. 4.
Inventors:
Stephen C. Hoare,
Allen T. Sinks,
by Harry E. Dunham
Their Attorney.

Patented June 30, 1942

2,288,399

UNITED STATES PATENT OFFICE 2,288,399

ELECTRICAL MEASURING DEVICE

Stephen C. Hoare, Manchester, and Allen T. Sinks, Beach Bluff, Mass., assignors to General Electric Company, a corporation of New York Application October 11, 1940, Serial No. 360,782

7 Claims. (Cl. 171—34)

This invention relates to electrical measuring apparatus and more particularly to electrical apparatus of the type employing rectifiers in conjunction with a device which is responsive to direct current or a direct current measuring instrument for measuring alternating current quantities.

It is common in the art of electrical measurements to measure alternating current voltages or currents by means of a direct current instrument in conjunction with one or more rectifiers. This method is well suited to the measurement of values of comparatively large magnitude. On the other hand, the foregoing method, though it is superior to the conventional type alternating current meter, is still not sufficiently accurate, reliable or sensitive in the lower range of current values where accurate indications of output current are often desired. Consequently, where small values of alternating voltages or current are under observation, the divisions on the scale of the indicating instrument will be quite crowded. The foregoing disadvantages are attributed to the fact that certain rectifying elements, such for examples as diode valves of the thermionic type and copper-oxide rectifiers of the contact type, exhibit a very high resistance to the passing of current in the lower part of their operating characteristic or voltage range. Consequently, the slope of the characteristic curve showing the relation between impressed potential and output current is so small at or near the bottom portion of the curve that the output currents corresponding to minute impressed potentials are too small to produce a sensitive deflection or movement of the direct current responsive instrument. This resistance, however, decreases materially with increased magnitudes of potential applied to the circuit of the rectifiers.

It is an object of our invention, therefore, to provide an improved measuring device which is particularly adapted to the measurement of minute alternating current quantities.

It is another object of our invention to improve the efficiency and sensitivity of a rectifier-type measuring instrument.

It is a further object of our invention to provide in a rectifier-type measuring device a more linear scale distribution in the lower range of measurement.

It is another object of our invention to provide an improved biasing arrangement for a rectifier-type measuring instrument which permits the rectifier elements to be biased to the desired degree without affecting the zero or reference point of the indicating or current-responsive instrument.

Other and further objects and advantages of our invention will become apparent as the description proceeds.

In carrying the invention into effect in one form thereof arrangements are provided whereby alternating current quantities of small magnitude are rendered effective to produce an appreciable deflection or response in a direct current responsive device or instrument. The foregoing beneficial result is accomplished by the use of a novel circuit arrangement which is adapted to be connected to the alternating current circuit under observation and which comprises a plurality of rectifiers, a source of direct current potential for biasing the rectifiers, and a direct current instrument, preferably of the d'Arsonval type. The circuit may be controlled to pass the desired amount of biasing current through the rectifier element and it may be further adjusted so that a desired portion of this biasing current flows through the current coil of the measuring device in either direction or so that none of the biasing current flows through the measuring element. By means of the foregoing arrangement, we have been able to increase the accuracy, efficiency and sensitivity of a direct current instrument when employed in conjunction with a rectifier for the detection and measurement of small alternating currents or voltages near the zero level and, in the particular case, of alternating current voltages or currents below the range of sensitivity of the usual alternating current instrument or current responsive devices.

The novel features which we believe to be characteristic of our invention are set forth with particularity in the appended claims. Our invention itself, however, both as to its organization and method of operation may best be understood by reference to the following description taken in connection with the accompanying drawing.

In the drawing, Fig. 1 is a diagrammatic representation of a rectifier-type measuring instrument arranged in accordance with our invention; Fig. 2 is a graphical view showing the characteristics of a conventional rectifier-type measuring instrument, and the corresponding characteristics of a rectifier-type measuring instrument incorporating the principles of our invention and of the character shown in Fig. 1; Figs. 3 and 5 illustrate the scale distribution of conventional rectifier-type measuring instruments; Figs. 4 and 6 are views showing how the respective scales of Figs. 3 and 5 may be expanded in the lower range by the employment of rectifier-type measuring instruments arranged in accordance with our invention; Fig. 7 is a differential type measuring device in which the principles of our invention are employed; and Fig. 8 is a graphical view showing characteristics obtained by the use of the arrangement of Fig. 7 in contrast with those obtained by a conventional instrument.

Referring now to the drawing, in Fig. 1, we have shown a rectifier-type measuring instrument in the form of a bridge and which may comprise two rectifier elements such as 10 and 11 or 12 and 13 in adjacent arms and two impedance elements in the remaining adjacent arms or which may be arranged with a rectifier element in each arm as shown in the drawing. The rectifier elements 10, 11, 12 and 13, which are connected in the respective arms of the bridge and the impedances of which decrease as the applied voltage increases, may be of any suitable construction, such for examples as a metal or copper-oxide rectifier or a thermionic valve of the diode type. The alternating current quantity, such as a current or voltage to be measured, is connected to the input terminals 15 and 16 of the bridge. To the output terminals 17 and 18 of the bridge is connected the current coil 19 of a direct current responsive device 20, such as a d'Arsonval measuring instrument.

With a circuit of the character thus far described, if values of the indicated direct current intensity as measured by the instrument 19 corresponding to a number of different values of input voltage be plotted in graphical form a characteristic curve will be obtained, similar to curve A of Fig. 2. The slope of the curve is a function of the overall admittance of the rectifier elements and the coil 19 of the measuring device. An inspection of curve A indicates that within the lower range of voltage applied to the input terminals 15 and 16 the curve tends to parallel the abscissa so that relatively large variations in the applied voltage are necessary to effect minute changes of the output or direct current flowing from the terminals 17 and 18. On the other hand, within the range of comparatively high applied voltages the slope of the characteristic curve becomes steeper so that a given variation in applied voltage is accompanied by current flow in the output circuit which is greatly accentuated over the current flow which the same variation in applied voltage would produce with operation on the lower portion of the characteristic curve of the rectifier. Curve B, when contrasted with curve A, illustrates the marked increase in sensitivity obtained by the employment of our invention.

Reference to Fig. 3, which shows a scale 21 calibrated in alternating current millivolts, indicates that a rectifier-type instrument gives a very crowded scale when operated in the lower portion of the characteristic curve of the rectifier and is thus relatively insensitive to the values of applied potential within the vicinity of the zero level.

We provide means for biasing each rectifier element so that it operates in the steep part of its input-output characteristic even for minute values of the applied potential or current to be measured. In the illustrated arrangement, an adjustable resistance element 22 of a suitable magnitude determined by the other constants of the circuit is connected in series circuit relation with the coil 19 of the direct current measuring instrument to the output terminals 17 and 18 of the rectifier bridge. This resistance element may be made adjustable or fixed depending upon the method to be employed in adjusting the system. This feature will be explained more fully hereinafter. A resistor 23 in the form of a potentiometer having an adjustable contact 24 is connected in shunt with the coil 19 of the current responsive device 20. The contact 24 divides the resistor 23 into complementary portions 25 and 26. A source of unidirectional potential 28 such as a dry cell is connected between the point 18 and the adjustable contact 24 in series circuit relation with an adjustable resistance element 29.

In Fig. 4 we have illustrated diagrammatically a direct current instrument 20 of the d'Arsonval type with its movable coil 19 secured to a rotatable spindle or shaft 30 and positioned to interact with the field produced by permanent magnets 31. The spindle 30 is shown mounted in suitable jewels 32 and is arranged to operate a pointer 33 which cooperates with a scale 21a. In the instant case the scale is calibrated in alternating current millivolts. Electrical current from the direct current output terminals 17 and 18 may be conducted to the current coil 19 through a pair of control springs such as 34. One end of each spring 34 is secured to the shaft 30 and the other end is secured to a connector element 35 by means of which the control spring may be adjusted to position the pointer 33 at any desired angular position along the scale 21a. In the arrangement of Fig. 4 the natural "mechanical" zero position of the pointer 33, as determined by the adjustment of the control spring 34, is set at a point approximately 35 degrees up-scale and the "electrical" zero is set at the conventional left-end position.

The arrangement of the present invention includes means whereby each rectifier element is biased for a condition of zero input at the measuring terminals 15 and 16, the biasing being adjusted for the most sensitive scale range that starts from zero since this is what is required of a straight deflectional instrument that measures values down to zero. Thus, when the measuring device is arranged to operate as shown in Fig. 4 with the electrical zero out of coincidence with the mechanical zero, the system of Fig. 1 is initially adjusted so that a resultant current flows through the coil 19 from the source 28 in the proper direction to cause the pointer 33 to move from position 33' to the zero-point on the scale 21a as shown in the drawing. From an inspection of Fig. 1 it will be observed that with the rectifiers poled as shown, the measured current flows from a to b in the coil 19 to produce an up-scale deflection of the pointer 33. Thus to cause the pointer to move down scale to the electrical zero position the circuit is initially adjusted with zero input at the measuring terminals 15 and 16 so that a resultant current from the source 28 flows through the coil 19 from b to a.

Considering the system connected as in Fig. 1 and with zero input at the measuring points 15 and 16, by adjusting the potentiometer contact 24 or the resistor 22 the desired amount of current may be made to traverse the coil 19 of the instrument 20 from the battery 28 and by adjusting the resistor 29 the proper amount of biasing current may be sent through the rectifier elements to give the most sensitive response. Once the potentiometer contact 24 or the resistance element 22 has been set to give a zero scale indication for the proper biasing current, after proper calibration, the device is ready for use. Thereafter, a precise and predetermined degree of biasing is applied simply by adjusting the rheostat 29 until the pointer 33 swings from a mechanical to an electrical zero point on the instrument scale. The instrument is thus brought into a precalibrated condition without the need of using extra instruments to set the degree of biasing.

It will be appreciated that the connection 24 may be permanently made to an intermediate point on the coil 19, if desired, in which case the potentiometer which shunts the instrument may be dispensed with. The resistor 22 may then be employed to initially adjust the instrument zero. However, the potentiometric arrangement provides greater flexibility and it is of more simple construction since it is not necessary to make a connection to the coil turns. The potentiometer permits of by-passing relatively heavy biasing currents around the very sensitive instrument without affecting its state of zero indication, and it further permits of abstracting just enough of the heavy biasing current to effect control of the zero or reference position of the instrument. To accomplish the biasing without the use of a potentiometer would require the use of a relatively high current element for the instrument in order to take care of the large value of biasing current required. The instrument would in consequence be rendered relatively insensitive to the small quantities under measurement. It should also be pointed out that the contact 24 may be permanently made at point b to apply the biasing potential directly across the resistance element 22. In such a case, however, the bias point may be only at some up-scale position whereas the illustrated embodiment permits adjustment of the bias point either up or down the scale as desired.

In connection with the operation of millivoltmeters to measure electrical quantities of small magnitude it is customary to employ a "swamping" resistance to improve the temperature characteristics. In Fig. 1 such a resistance is indicated at 37 and is connected in series with the rectifier input. By the insertion of an additional resistance element such as 38, the instrument may be employed as a voltmeter without biasing by dispensing with the dry cell or source of potential 28 and the small rheostat 29.

The description of the arrangement of Fig. 1 has thus far been predicted on the condition of operation, as illustrated in Fig. 4, in which the mechanical and electrical zeros are positioned at some distance apart on the scale in order to enable the user to make a more positive adjustment of the bias, that is, to the electrical zero point. If preferred, however, the two zero positions may be made coincidental, the user then turning the rheostat 29 to maintain the zero indication before applying the voltage to be measured. It will be apparent that such a condition of operation is obtained when the potential drops across sections 25 and 26 are equal and opposite so that for zero input to the measuring terminals 15 and 16 none of the current from the source 28 flows through the instrument coil 19. Fig. 6 illustrates the scale characteristics obtained with a 200 milliampere capacity millivoltmeter when arranged as in Fig. 1 but having coincident mechanical and electrical zeros. The scale distribution of Fig. 5 was obtained with the same instrument connected without biasing in a conventional circuit. The marked difference in the two cases in the magnitude of the current required for full scale deflection is apparent from inspection of the two scales. When the system is adapted for use as a dual instrument, that is as a combination A. C. millivoltmeter-voltmeter, it may be found preferable from the standpoint of avoiding confusion to have coincident electrical and mechanical zeros so that the zero value of each scale lies at the same position on the scale. It may be found desirable, however, to effect a compromise in this respect by using a very small offset in the zeros so that the operator may make certain that the biasing system is operable. When the arrangement is operated with coincident zeros the potentiometer in shunt with the coil 19 must initially be unbalanced so that the operator may apprise himself as to the amount of biasing potential being used.

Irrespective of whether the foregoing system is operated with a displacement or coincidence between the mechanical and electrical zeros, the rectifier is biased so that it carries a current somewhere near normal current density or to a value sufficient to give the most sensitive scale range that starts from zero. The sensitivity of the instrument in the lower range has been greatly increased because of the fact that the biasing arrangement reduces the input impedance so that the instrument draws more current and causes the rectifier to operate at a more efficient part of the characteristic curve. Consequently, it is possible to obtain relatively large indications with low orders of voltages—voltages too small to produce appreciable indications in an instrument as usually constructed. The biasing means of the present invention also tends toward more linear scale distribution.

In Fig. 7 we have illustrated the principles of our invention as applied to a differential rectifier measuring device of the general character as described and claimed in U. S. Patent 1,985,095, issued December 18, 1934, to one of the present applicants, S. C. Hoare, and assigned to the General Electric Company, the assignee of the present invention. The invention is applicable to direct and alternating current circuits of the Wheatstone bridge type as shown in the drawing for measuring resistances or impedances. It is also applicable to apparatus in general utilizing balanced or opposing direct or alternating current circuits, such as illustrated, for example, in Figs. 2 and 3 of the aforesaid patent. The device provides a directional indication of the magnitude of the difference between the quantities or related circuits being compared so that it is possible to ascertain on which side of balance the circuit conditions lie.

Referring to Fig. 7 of the drawing, there is shown a Wheatstone bridge circuit comprising four impedances 40, 41, 42, and 43. The pair of impedances 40 and 41 are arranged in parallel relation with the pair of impedances 42 and 43 and have their common terminals 44 and 45 connected to a suitable source of electrical energy 46 which, as will be understood, may be either alternating or direct current. Connected across diagonal points 47 and 48 is the current coil 19a of a direct-current measuring instrument such as a d'Arsonval galvanometer, the moving element of which is mechanically biased to an up-scale or zero-center position with respect to the instrument scale or range of deflection. The current-responsive element 19a is connected between balance points 47 and 48 in series with current limiting impedances 49, 50 and rectifiers 51 and 52. The rectifiers 51 and 52 are so arranged that one tends to permit current to flow in only one direction and the other tends to permit current to flow in only the other direction with respect to the balance points. For example, the rectifiers 51 and 52 may be arranged so that current tends to flow only toward the balance points 47 and 48 or only toward the current-responsive device 19a as shown in the drawing.

In order that the direction of deflection of the current-responsive device will indicate in which arm 41 or 42, for example, there is the greater voltage drop—assuming these to be fixed impedances and arm 43, for example, the element of which the impedance is to be measured—a common terminal of the parallel circuits, such as the terminal 45, is connected by means of a conductor 53 to a neutral point 53a with respect to the ends of the winding of the current-responsive device 19a. This may be done by dividing the winding of the current-responsive device into two portions with a common terminal forming a neutral point as shown in Fig. 7a so that a null deflection is obtained when the currents or potential drops are equal, or it may be done as shown in Fig. 7 by connecting an impedance 23a in shunt with respect to the ends of the simple single winding of the current-responsive device 19a and joining the point 45 with a point 53a, which is preferably the midpoint of the impedance 23a. The impedance is shown divided into sections 54 and 55.

In order to increase the sensitivity of the current-responsive device 19a we connect a suitable source of direct current, such as a battery 56, in the line 53 and between points 45 and 53a. The source of supply 56 is poled to send current through the rectifier elements as shown by the arrows and is of sufficient voltage to pass the desired biasing current, for example in a particular case, five milliamperes for the rectifier elements, through the resistance or impedance of the bridge arms. It will be appreciated that for equal biasing potentials across the sections 54 and 55 there will be a null deflection of the current-responsive element 19a.

In the operation of the apparatus of Fig. 7, assuming a symmetrical arrangement of resistors in the galvanometer circuit, where 49 and 50, are of equal magnitude, and also where the potential drops across 41 and 42 are equal as obtains with a balanced condition of the bridge, the insertion of the battery 56 generally has the effect of throwing the current-responsive device off balance in a degree determined by the dissimilarity of the two half-wave rectifiers 51 and 52. Galvanometer balance can then be restored by altering resistors 49 and 50. For this reason it is preferable to make one of these resistors, such as 50, in the form of an adjustable rheostat. The galvanometer may also be brought into balance by making the contact 53a adjustable as illustrated by the contact 24 of Fig. 1. Current flowing through the rectifier element 51 and impedance 49 divides, part flowing through the upper portion 54 of the potentiometer or impedance 23a and the other part flowing through the current-responsive device 19a and the lower portion 55 of the impedance 23a to the intermediate point 53a. Current flowing through the impedance 50 and the rectifier 52 will divide in a similar manner between the current-responsive device 19a and the lower portion 55 of the impedance 23a, flowing, however, in the opposite direction through the current-responsive device 19a. It will be appreciated that in the case of direct-current measurements, the polarity of the source 46 will be made such that the point 44 is positive and the point 45 is negative.

The deflection of the current-responsive device 19a will be dependent upon the algebraic sum of the two currents flowing through the impedances 49 and 50. If the value of one of the impedances of the bridge is then varied so as to throw the circuit into unbalance in the opposite direction, current in the current-responsive device 19a will be in the opposite direction and a deflection in the opposite direction will be produced, thereby indicating that the point of balance has been passed in changing the impedances of the bridge. Obviously measurements may be made either by adjusting the impedances until a balance is obtained or by retaining a fixed adjustment and calibrating the instrument 19a in terms of the quantity to be measured.

It will be apparent that the response of the device 19a depends upon the difference in absolute values of the voltages in arms 41 and 42 and is independent of phase relationship where alternating current impedance measurements are being made. Thus by omitting elements 40 and 43, the differential measuring system may also be employed for comparing alternating or direct currents or voltages in any two electrical circuits, as well as in bridge circuits of the general character shown in the drawing, merely by producing potential drops in the arms 40 and 41 which are proportional respectively to the voltages or currents being compared. Where the arms 41 and 42 are energized by direct current, care will obviously be taken to connect them with the proper polarities with respect to the measuring apparatus. The instrument 19a will thus respond to either alternating or direct currents and it will also indicate which of two opposing circuits is carrying the greater current.

In Fig. 8 we have illustrated characteristic curves showing the relation between the current in the galvanometer coil 19a or the deflection of the movable element with various degrees of change in one of the arms of the bridge in Fig. 7, such as arm 43. The curves 58 and 59 illustrate the results obtained by the omission of the energy source 56 respectively for increasing and decreasing values of impedance in arm 43, while curves 60 and 61 illustrate corresponding results obtained with the circuit as shown in Fig. 7 respectively for increasing and decreasing values of impedance in the arm 43. It is apparent that the gain in sensitivity due to biasing is approximately three to one.

In accordance with the provisions of the patent statutes we have described the principles of operation of our invention together with the apparatus which we now consider to represent the best embodiments thereof, but we desire to have it understood that the apparatus shown is only illustrative and that the invention may be carried out by other means.

What we claim as new and desire to secure by Letters Patent of the United States is:

1. In an electrical network responsive to an electrical quantity, input terminals for impressing said quantity on said network, a rectifier element, a direct current-responsive device including a current conducting winding, means connecting said rectifier element and said winding in series circuit relation with respect to each other and in circuit with said input terminals, an impedance element connected in parallel with said winding, said impedance element having a terminal intermediate the ends thereof, an auxiliary source of unidirectional potential, and means connecting said auxiliary source of potential in a circuit including said intermediate terminal and said rectifier element for causing an auxiliary biasing current to flow through said rectifier element in order to increase the sensitivity of said current responsive device to electric quantities connected to said input terminals.

2. An electrical measuring apparatus comprising a direct-current responsive device having a pair of main terminals and a pair of rectifiers each having a pair of terminals, one of the terminals of one of said rectifiers being connected to one terminal of said current-responsive device, one of the terminals of the other of said rectifiers being connected to the other terminal of said current-responsive device, the rectifiers being arranged for current passage in opposite directions, said current-responsive device having a terminal intermediate to said main terminals, impedance means connected in shunt with the circuit including said current responsive device and said rectifiers, said latter impedance having an intermediate point between which and the end terminals thereof may be impressed electric potentials to be compared, an auxiliary source of unidirectional potential, and means connecting said source of potential between the intermediate terminal of said current responsive device and the intermediate point of said impedance means, said source of potential being of such polarity as to cause a biasing current to flow through said rectifier elements to increase the sensitivity of said current-responsive device to the potentials impressed on said impedance means.

3. An electrical apparatus for comparison measurements of two electrical quantities, a pair of impedance elements connected to have a common terminal and independent terminals, said impedance elements adapted to be subjected respectively to said electrical quantities and in such a way that each of said independent terminals are of the same polarity and of opposite polarity to said common terminal, a direct-current responsive electrical device having a pair of terminals, a pair of half-wave rectifiers, one of said rectifiers being connected between one of the terminals of said current-responsive device and one of said independent terminals, the other of said rectifiers being connected between the remaining terminal of said current-responsive device and the other of said independent terminals, said rectifiers being arranged for current passage in opposite directions with respect to said current-responsive device, an impedance connected in parallel with said current-responsive device, an auxiliary source of unidirectional voltage, and means connecting said auxiliary source of voltage between the common terminal of said impedance elements and a point intermediate the ends of the impedance which is connected in parallel with said current-responsive device, said source of voltage being of such polarity as to cause current to flow therefrom through said rectifiers.

4. In electrical measuring apparatus, a full wave rectifier comprising four rectifier elements connected in a bridge circuit, input terminals and direct current output terminals for said bridge, a direct-current responsive device connected between said output terminals, a potentiometer connected in parallel with said current-responsive device, said potentiometer having a contact adjustable to different positions intermediate the ends thereof, an auxiliary source of direct current potential, and means connecting said source of potential between said adjustable contact and one of said output terminals, the polarity of said source being such that a biasing current is caused to flow through each of said rectifier elements for decreasing the forward impedance of said elements to improve the sensitivity of said current-responsive device.

5. In rectifier-type measuring apparatus, a full-wave rectifier having a pair of input and output terminals, a current-responsive device having a current conducting winding, an adjustable resistance element, means connecting said winding and said resistance element in series between said output terminals, an impedance device connected in shunt with said winding, an auxiliary source of unidirectional voltage, and means connecting said auxiliary voltage source in shunt with said adjustable resistance element and a portion of said impedance device, the polarity of said auxiliary voltage source being arranged to send a biasing current through the rectifier elements comprising said full wave rectifier for changing their impedance characteristic with respect to electrical quantities to be connected to said input terminals in order to increase the sensitivity of said current-responsive device.

6. In a bridge circuit having a pair of opposite terminals for connection to a current source and a second pair of opposite terminals for connection to a current responsive device, differential indicating means comprising a direct-current responsive device, a pair of half-wave rectifiers arranged for current passage in opposite directions and connected on either side of said current responsive device in series therewith between the second-mentioned pair of terminals of said bridge circuit, an impedance connected in parallel with said direct-current responsive device, an auxiliary source of unidirectional potential, and means connecting said source of unidirectional potential between an intermediate point of said impedance element and one of the current supply terminals of said bridge circuit, the polarity of said auxiliary potential source being arranged to send current through said rectifiers in the forward direction.

7. An electrical measuring network, input terminals for impressing a voltage on said network, rectifier means, a direct current responsive device including a current conducting winding, means connecting said rectifier means and said winding in series circuit relation with respect to each other in said network, an impedance element connected in parallel with said winding, said impedance element having a terminal intermediate the ends thereof, an auxiliary source of uni-directional potential, and means connecting said auxiliary source of potential in a circuit including said intermediate terminal and said rectifier means for causing an auxiliary biasing current which flows through said rectifier means in order to increase the sensitivity of the direct current responsive device.

STEPHEN C. HOARE.
ALLEN T. SINKS.